(12) United States Patent
Liu

(10) Patent No.: US 9,180,466 B2
(45) Date of Patent: Nov. 10, 2015

(54) COMBINATION DISCHARGE REACTOR FOR OIL SMOKE DECOMPOSITION

(71) Applicant: Hua-Ming Liu, Jiangsu (CN)

(72) Inventor: Hua-Ming Liu, Jiangsu (CN)

( * ) Notice: Subject to any disclaimer, the term of this patent is extended or adjusted under 35 U.S.C. 154(b) by 392 days.

(21) Appl. No.: 13/650,398

(22) Filed: Oct. 12, 2012

(65) Prior Publication Data

US 2014/0102302 A1     Apr. 17, 2014

(51) Int. Cl.
*B03C 3/38* (2006.01)
*B03C 3/06* (2006.01)
*B03C 3/36* (2006.01)
*B03C 3/41* (2006.01)
*B01D 53/32* (2006.01)
*B01D 53/92* (2006.01)

(52) U.S. Cl.
CPC ............... *B03C 3/38* (2013.01); *B01D 53/323* (2013.01); *B01D 53/925* (2013.01); *B03C 3/06* (2013.01); *B03C 3/368* (2013.01); *B03C 3/41* (2013.01); *B03C 2201/08* (2013.01)

(58) Field of Classification Search
CPC combination set(s) only.
See application file for complete search history.

(56) References Cited

U.S. PATENT DOCUMENTS

| 3,485,011 | A | * | 12/1969 | Reed et al. | 95/81 |
| 3,819,985 | A | * | 6/1974 | Dusevoir | 96/88 |
| 4,514,780 | A | * | 4/1985 | Brussee et al. | 361/226 |
| 6,270,733 | B1 | * | 8/2001 | Rodden | 422/186.07 |
| 6,321,531 | B1 | * | 11/2001 | Caren et al. | 60/275 |
| 6,334,982 | B1 | * | 1/2002 | Carlow et al. | 422/186.04 |
| 2005/0028676 | A1 | * | 2/2005 | Heckel et al. | 96/95 |

FOREIGN PATENT DOCUMENTS

WO     WO 9915267 A1  *  4/1999  ............ B01J 19/08

* cited by examiner

*Primary Examiner* — Duane Smith
*Assistant Examiner* — Sonji Turner
(74) *Attorney, Agent, or Firm* — Rosenberg, Klein & Lee

(57) ABSTRACT

A combination discharge reactor for decomposing waste gas is disclosed is disclosed to include a housing with a gas inlet and gas outlets, and multiple processing units mounted in the housing. Each processing unit includes a support structure consisting of brackets and support rods, a rod electrode mounted in the bracket, and a tubular electrode mounted in the brackets and surrounding the rod electrode.

11 Claims, 13 Drawing Sheets

COMBINATION DISCHARGE REACTOR FOR OIL SMOKE DECOMPOSITION

BACKGROUND OF THE INVENTION

1. Field of the Invention

The present invention relates to oil smoke decomposition technology and more particularly, to a combination discharge reactor for decomposing kitchen oil smoke, vehicle waste gas, tobacco smoke, or any other machining smokes generated from a lubricating oil, insulation oil or cutting oil.

2. Description of the Related Art

In most families, the homemaker acts as a main role in the kitchen. After having stayed in the kitchen, the housewife may feel a headache, chest tightness, itchy in the eyes, nasal congestion, or having tinnitus. Frequently staying in the kitchen for a long period of time may lead to "drunk oil syndrome" of insomnia, memory loss, bronchitis, pneumonia. These problems are caused by inhalation of kitchen oil smoke. Cooking edible oil and food at a high temperature will produce a large amount of thermal oxidative decomposition products that will be dispersed in the air in the form of a smoke. An oil smoke has complicated ingredients, mainly including aldehyde, ketone, hydrocarbon, fatty acid, alcohol, aromatic compounds, ester, lactone, heterocyclic compounds, and the known high carcinogens of benzopyrene, volatile ammonium nitrite and heterocyclic amine compounds.

It has been reported that frequently eating oil coagulant produced from foods cooked at 270° C. may lead to chromosome damage. This is one of the important factors that cause a rising incidence of female lung cancer. Recent lung cancer investigations in big cities exhibit the result that housewives engaging in cooking have a high risk of lung cancer. Further, cookers and people who are working under a high concentration of kitchen smoke tend to get a lung cancer have a greater risk to suffer from lung cancer and other intestinal or neuron disorders.

Not only kitchen oil smoke is harmful to human beings. Vehicle waste gas, tobacco smoke, and other machining smokes generated from lubricating oil, insulation oil or cutting oil can also pollute the environment and threaten people's health, leading to potential cancer risks to humans.

Conventional range hoods are commonly designed to expel stale kitchen air. These range hoods can reduce indoor kitchen oil smoke, however, the expelled stale kitchen air will pollute outdoor air.

SUMMARY OF THE INVENTION

The present invention has been accomplished under the circumstances in view. It is the main object of the present invention to provide a combination discharge reactor, which eliminates indoor and outdoor oil smoke pollution, and has the characteristics of low power consumption, low working temperature, high operation safety, high durability and non ozone generation. It is another object of the present invention to provide a combination discharge reactor, which is practical for decomposing kitchen oil smoke, vehicle waste gas, tobacco smoke, or any other machining smokes generated from a lubricating oil, insulation oil or cutting oil.

To achieve these and other objects of the present invention, a combination discharge reactor comprises a housing defining at least one gas inlet and at least one gas outlet, and a plurality of processing units mounted inside the housing. Each processing unit comprises a support structure comprising a plurality of brackets respectively mounted in the at least one gas inlet and the at least one gas outlet and a plurality of support rods connected between the brackets, a rod electrode prepared by an electric conducting material and mounted in the bracket between the at least one gas inlet and the at least one gas outlet, a tubular electrode prepared by an electric conducting material and mounted in the brackets between the at least one gas inlet and the at least one gas outlet and surrounding the rod electrode.

BRIEF DESCRIPTION OF THE DRAWINGS

FIG. 6-1 is an exploded view of FIG. 6.

DETAILED DESCRIPTION OF THE PREFERRED EMBODIMENT

Figure 1:
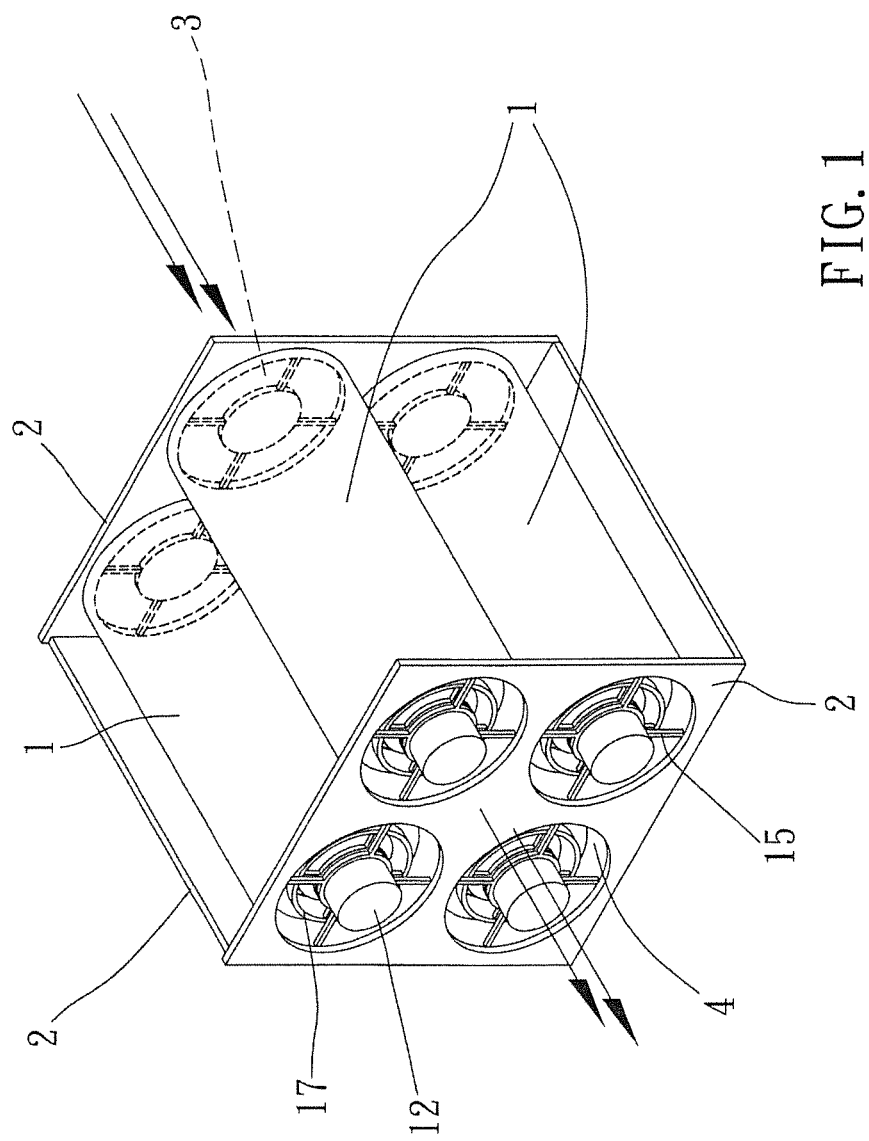
FIG. 1 is a schematic structural view of a rectangular combination discharge reactor in accordance with the present invention.

Referring to the annexed drawings in detail, a combination discharge reactor generally comprises a plurality of processing units 1, and a housing 2 having gas inlets 3 and gas outlets 4 at two opposite sides. Each processing unit 1 comprises a tubular electrode 17 or spiral electrode 14, a rod electrode 12, and a support structure consisting of two brackets 15 and support rods 16. The tubular electrode 17/spiral electrode 14 and the rod electrode 12 are mounted in the brackets 15. The brackets 15 of the processing units 1 are respectively mounted in the gas inlets 3 and gas outlets 4 of the housing 2 by the respective support rods 16.

The combination discharge reactor is a high voltage discharge reactor. The rod electrode 12 is adapted to discharge a high voltage to the tubular electrode 17 or spiral electrode 14 at a short distance. The rod electrode 12 has cone ring portions evenly distributed over the outer perimeter. The external hollow electrode 11 around the rod electrode 12 also has cone ring portions at the outer perimeter thereof. The tubular electrode 17 is also configured to provide cone ring portions at the outer perimeter thereof. Transverse grooves 13 are defined in the cone ring portions at the external hollow electrode 11 and the tubular electrode 17. The transverse grooves 13 can be configured to provide a perpendicular relationship relative to the axis of the rod electrode 12 or tubular electrode 17. Alternatively, the transverse grooves 13 can be kept at a predetermined angle in a staggered manner relative to the axis of the rod electrode 12 or tubular electrode 17. Further, multiple different sizes of tubular electrodes 17 may be concentrically arranged one inside another to receive a high voltage discharged by the rod electrode 12. The applied voltage can be in the range of 6 kv~500 kv. The power supply arrangement is an open circuit. The cone ring portions at each layer are adapted to pass a high voltage discharge. The transverse grooves 13 provide a passage for the distribution of intake oil smoke evenly in the whole discharge reactor. The tubular electrode 17 or spiral electrode 14 can be configured to provide multiple concentric layers. The number of the concentric layers can be determined subject to actual application requirements. A relatively larger number of concentric layers can be provided for treating heavy oil smokes.

Electric power supply can be electrically connected to the rod electrode 12 of each processing unit 1, or electrically connected in parallel to the concentric of every discharge layer. Because power supply is connected in an open circuit manner, no ozone will be produced after discharge.

During a high voltage discharge of every layer of cone ring portions, a high concentration ion flux is produced, wherein the kinetic energy of the electrons thus produced can decompose oil smoke into stable substances, such as water, carbon dioxide and nitrogen for output outdoors, avoiding environmental air pollution.

Each processing unit 1 of the discharge reactor is a discharge structure comprising a rod electrode 12 and a multilayer tubular electrode 17 or spiral electrode 14. Multiple processing units 1 can be arranged in together to exhibit a circular, rectangular or any other irregular profile subject to the desired shape and size.

Electric power arrangement includes a negative high voltage and a positive high voltage. The applied voltage can be in the range of 6 kv~500 kv. The distance between the rod electrode 12 and the multi-layer tubular electrode 17/spiral electrode 14 can be in the range of 0~100 mm that is determined subject to the high voltage to be applied.

The combination discharge reactor for oil smoke decomposition is characterized in that:

In one individual discharge structure of one rod electrode 12 and one tubular electrode 17, the tubular electrode 17 is selected from a material having excellent electric conductivity, having an inner diameter in the range of 10~2000 mm, an outer diameter slightly greater than the inner diameter, and a wall thickness above 0.05 mm; the rod electrode 12 is positioned at the center inside the tubular electrode 17, i.e.; inserted through the tubular electrode 17; the tubular electrode 17 can be a multi-layer formed of multiple tubular electrodes of different sizes arranged in a concentric manner. A spiral electrode 14 may be used to substitute for the tubular electrode 17. The rod electrode 12 and the tubular electrode 17 or spiral electrode 14 are selected from a material having excellent electric conductivity, having cone ring portions disposed around the outer perimeter for discharging a high voltage.

The tubular electrode 17 is processed to provide transverse grooves 13 around the outer perimeter in a staggered manner relative to that of the rod electrode 12. The transverse grooves 13 provide a passage for the distribution of intake oil smoke evenly in each discharge layer for high-efficiency decomposition.

When a multilayer tubular electrode 17 or spiral electrode 14 is used for modularization application, an electrically insulative material should be provided around the multilayer tubular electrode 17 or spiral electrode 14 at a pitch in the range of 1~100 mm. This electrically insulative material can be made having a circular, rectangular or any other profile subject to actual requirements, for example, this electrically insulative material can be an insulating barrel 20.

Multiple processing units can be arranged together to constitute a combination discharge reactor having a circular, rectangular or any other profile. The size and shape of the combination discharge reactor can be determined subject to the desired decomposition speed and the type of oil smoke to be treated.

Electric power arrangement includes a negative high voltage and a positive high voltage. The applied voltage can be in the range of 6 kv~500 kv. The power supply arrangement is an open circuit. Electric power supply can be electrically connected to the rod electrode 12 of each processing unit 1, or electrically connected in parallel to the concentric of every discharge layer.

Oil smoke is guided into the processing units 1 in the combination discharge reactor for decomposition. The decomposition efficiency is over 95%.

The combination discharge reactor eliminates electrolysis reactions, avoiding generation of ozone or other unexpected substances.

When compared to conventional techniques, the combination discharge reactor is a modularized design for continuously treating a large amount of oil smoke, allowing adjustment of the size of the tubular electrode 17 or spiral electrode 14, the applied voltage, the pitch between the rod electrode 12 and the tubular electrode 17/spiral electrode 14, pulsed discharge frequency, power of applied power supply and other parameters subject to the type of the oil smoke to be treated and the amount of the oil smoke per unit time. The invention has the characteristic of low power consumption, about one twentieth of conventional electrostatic oil separators. The combination discharge reactor of the present invention is a low temperature reactor, ensuring high operational safety. Further, the invention eliminates the problem of discharge needle rust, has a long service life, and does not produce ozone during operation.

The combination discharge reactor is practical for use to decompose kitchen oil smoke, vehicle waste gas, tobacco smoke, or any other machining smokes generated from a lubricating oil, insulation oil or cutting oil.

Example I

Figure 2:
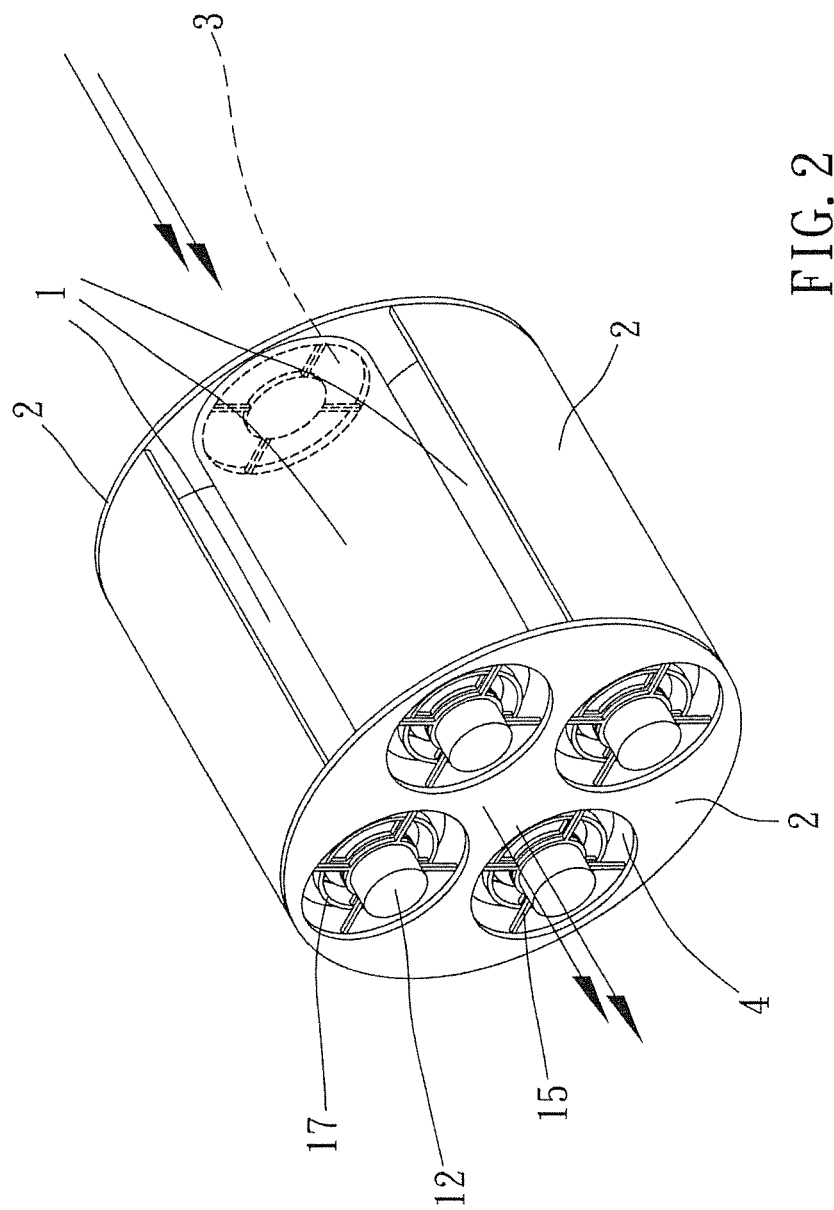
FIG. 2 is a schematic structural view of a circular combination discharge reactor in accordance with the present invention.

As shown in FIG. 2, the combination discharge reactor comprises four processing units 1, and a housing 2 accommodating the processing units 1. The housing 2 comprises a gas inlet 3 disposed at one side thereof, and four gas outlets 4 disposed at an opposite side thereof. Each processing unit 1 comprises a tubular electrode 17, and a rod electrode 12 axially mounted in the tubular electrode 17.

Figure 4:
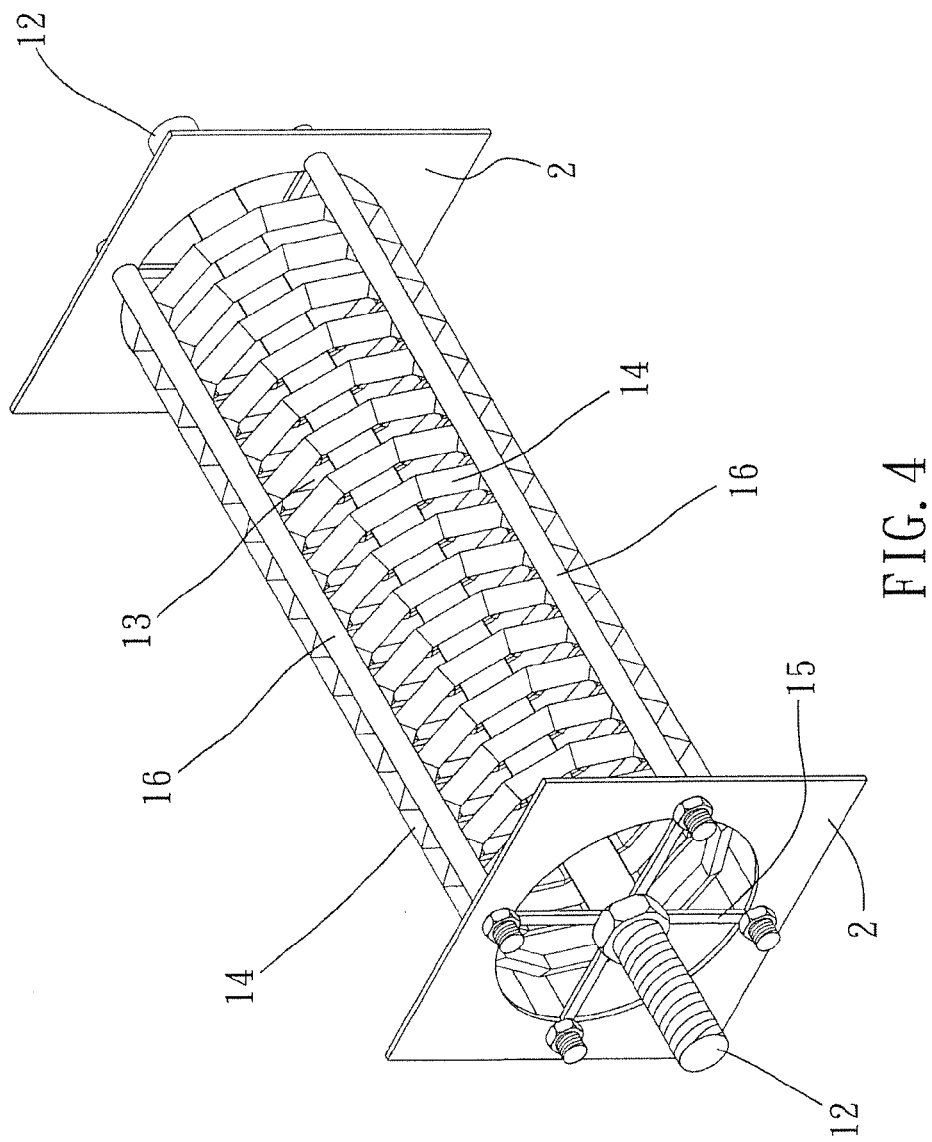
FIG. 4 is a schematic drawing illustrating a processing unit with a discharge layer of spiral electrode in accordance with the present invention.

The tubular electrode 17 is a hollow cylindrical electrode, as shown in FIG. 4, having an inner diameter 120 mm, and a wall thickness above 2 mm. The pitch between the rod electrode 12 and the tubular electrode 17 is 10 mm. The rod electrode 12 and the outer perimeter of the tubular electrode 17 are respectively processed to provide cone ring portions and transverse grooves 13 around the cone ring portions. The transverse grooves 13 at the tubular electrode 17 are disposed in a stagger manner relative to that at the rod electrode 12. The tubular electrode 17 is supported between two brackets 15 at the housing 2, and peripherally coated with a 3 mm electrically insulative protective layer.

Figure 3:
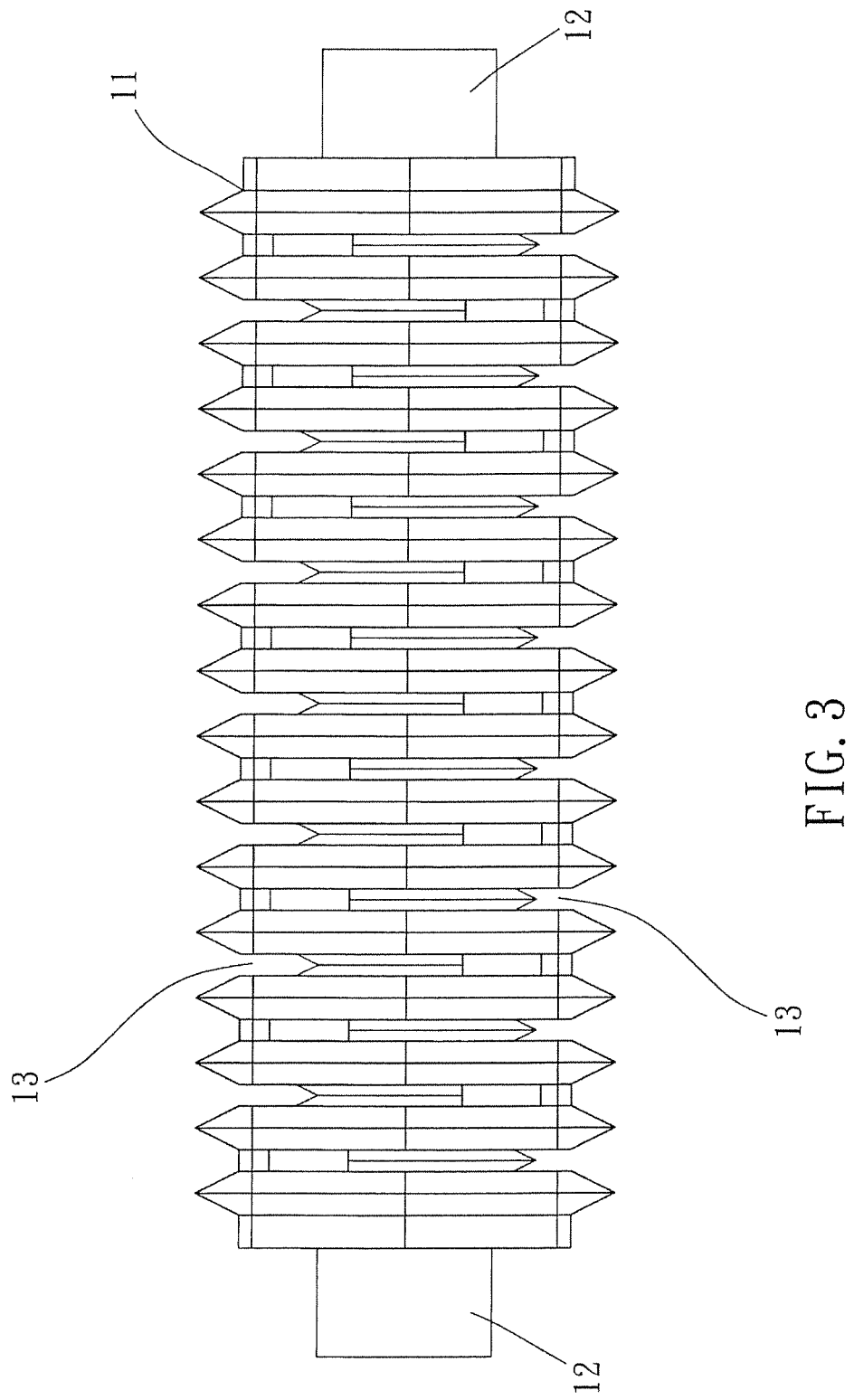
FIG. 3 is a schematic drawing illustrating a processing unit with a discharge layer of tubular electrode in accordance with the present invention.

The rod electrode 12 of each processing unit 1 is positioned at the center inside the tubular electrode 17, i.e., inserted through the tubular electrode 17. The rod electrode 12 and the tubular electrode 17 are selected from a material having excellent electric conductivity. The rod electrode 12 of each processing unit 1 is processed to provide cone ring portions and transverse grooves 13 around the cone ring portions. The transverse grooves 13 of the rod electrode 12 are configured at 90° relative to the axis of the rod electrode 12, as shown in FIG. 3. The cone ring portions of the rod electrode 12 work as the high voltage discharge terminal.

During application, the rod electrode 12 is electrically connected to the negative pole, and 8 kv is applied.

Example II

As shown in FIG. 1, the combination discharge reactor comprises four processing units 1, and a housing 2 accommodating the processing units 1. The housing 2 comprises four gas inlets 3 disposed at one side thereof, and four gas outlets 4 disposed at an opposite side thereof. Each processing unit 1 comprises a tubular electrode 17, and a rod electrode 12 axially mounted in the tubular electrode 17.

Figure 5:
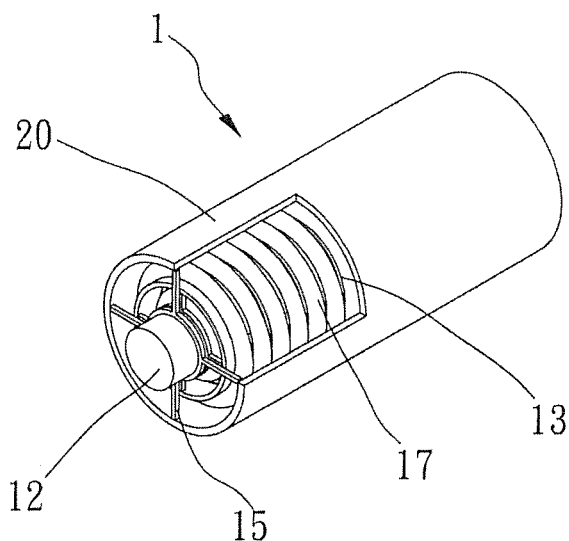
FIG. 5 is a schematic drawing illustrating a processing unit with a discharge layer formed of two concentrically arranged tubular electrodes in accordance with the present invention.

The tubular electrode 17 is a hollow cylindrical electrode formed of two concentric electrode layers, as shown in FIG. 5, having an inner diameter 100 mm. The two concentric electrode layers of the tubular electrode 17 commonly have a layer thickness 2 mm. The pitch between the two concentric electrode layers of the tubular electrode 17 is 10 mm. The rod electrode 12 and the outer perimeter of the tubular electrode 17 are respectively processed to provide cone ring portions and transverse grooves 13 around the cone ring portions. The transverse grooves 13 at the tubular electrode 17 are disposed in a stagger manner relative to that at the rod electrode 12. The outer electrode layer of the tubular electrode 17 is supported between two brackets 15 at the housing 2, and peripherally coated with a 3 mm electrically insulative protective layer.

Figure 7:
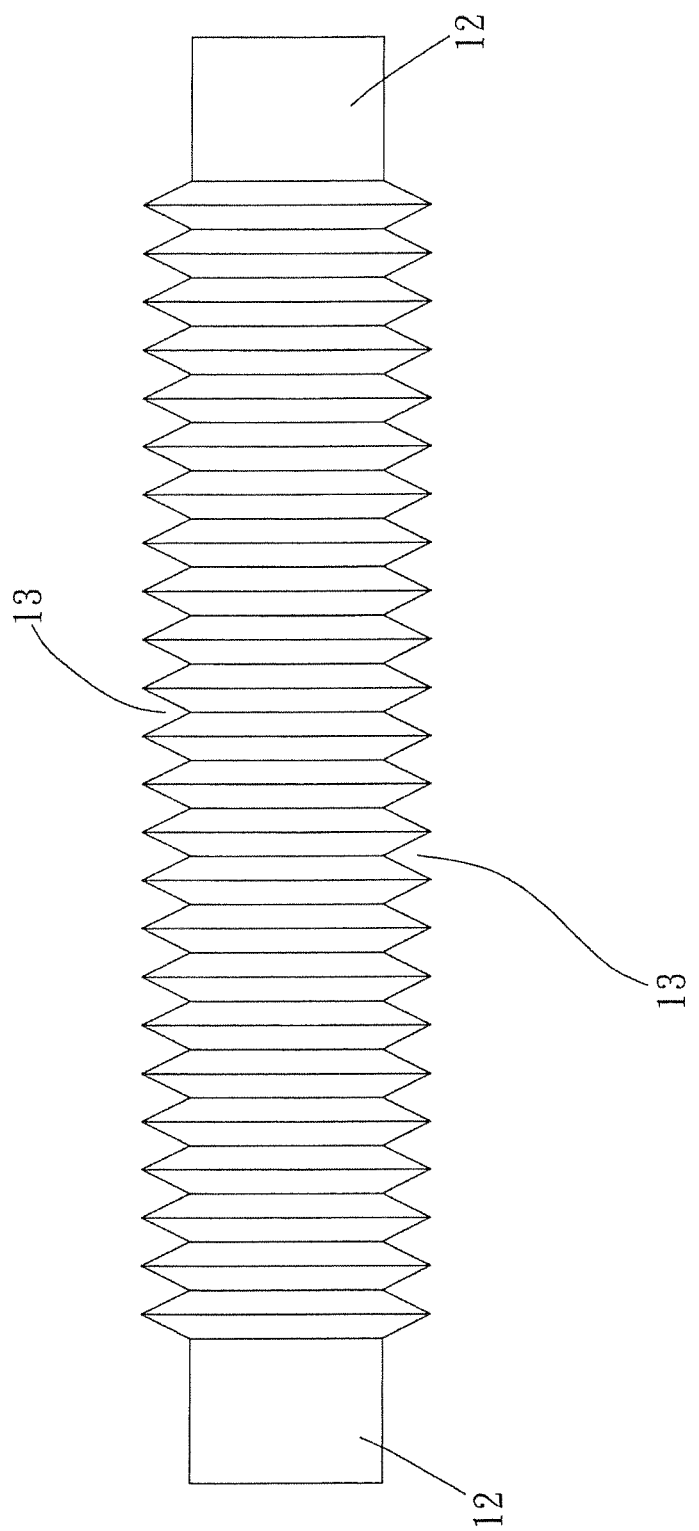
FIG. 7 illustrates one example of the rod electrode in accordance with the present invention, wherein the transverse grooves is disposed at a 90° relationship relative to the axis of the rod electrode.

The rod electrode 12 of each processing unit 1 is positioned at the center inside the associating tubular electrode 17, i.e., inserted through the tubular electrode 17. The rod electrode 12 and the tubular electrode 17 are selected from a material having excellent electric conductivity. The rod electrode 12 of each processing unit 1 is processed to provide cone ring portions and transverse grooves 13 around the cone ring portions. The transverse grooves 13 of the rod electrode 12 are configured at 90° relative to the axis of the rod electrode 12, as shown in FIG. 7. The cone ring portions of the rod electrode 12 work as the high voltage discharge terminal.

During application, the rod electrode 12 is electrically connected to the negative pole, and 10 kv is applied.

Example III

As shown in FIG. 2, the combination discharge reactor comprises four processing units 1, and a housing 2 accommodating the processing units 1. The housing 2 comprises four gas inlets 3 disposed at one side thereof, and four gas outlets 4 disposed at an opposite side thereof. Each processing unit 1 comprises three tubular electrodes 17; 18; 19 arranged in a concentric manner, and a rod electrode 12 axially mounted in the tubular electrodes 17; 18; 19.

Figure 6:
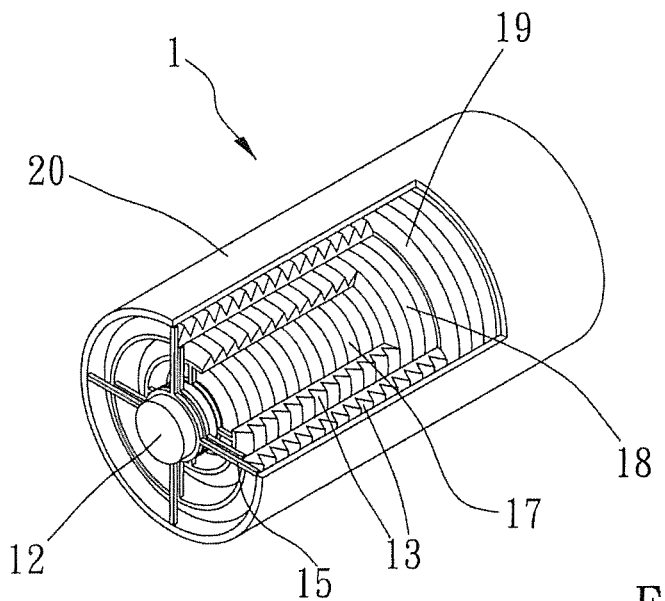
FIG. 6 is a schematic drawing illustrating a processing unit with a discharge layer formed of three concentrically arranged tubular electrodes in accordance with the present invention.
Figures 1, 6:
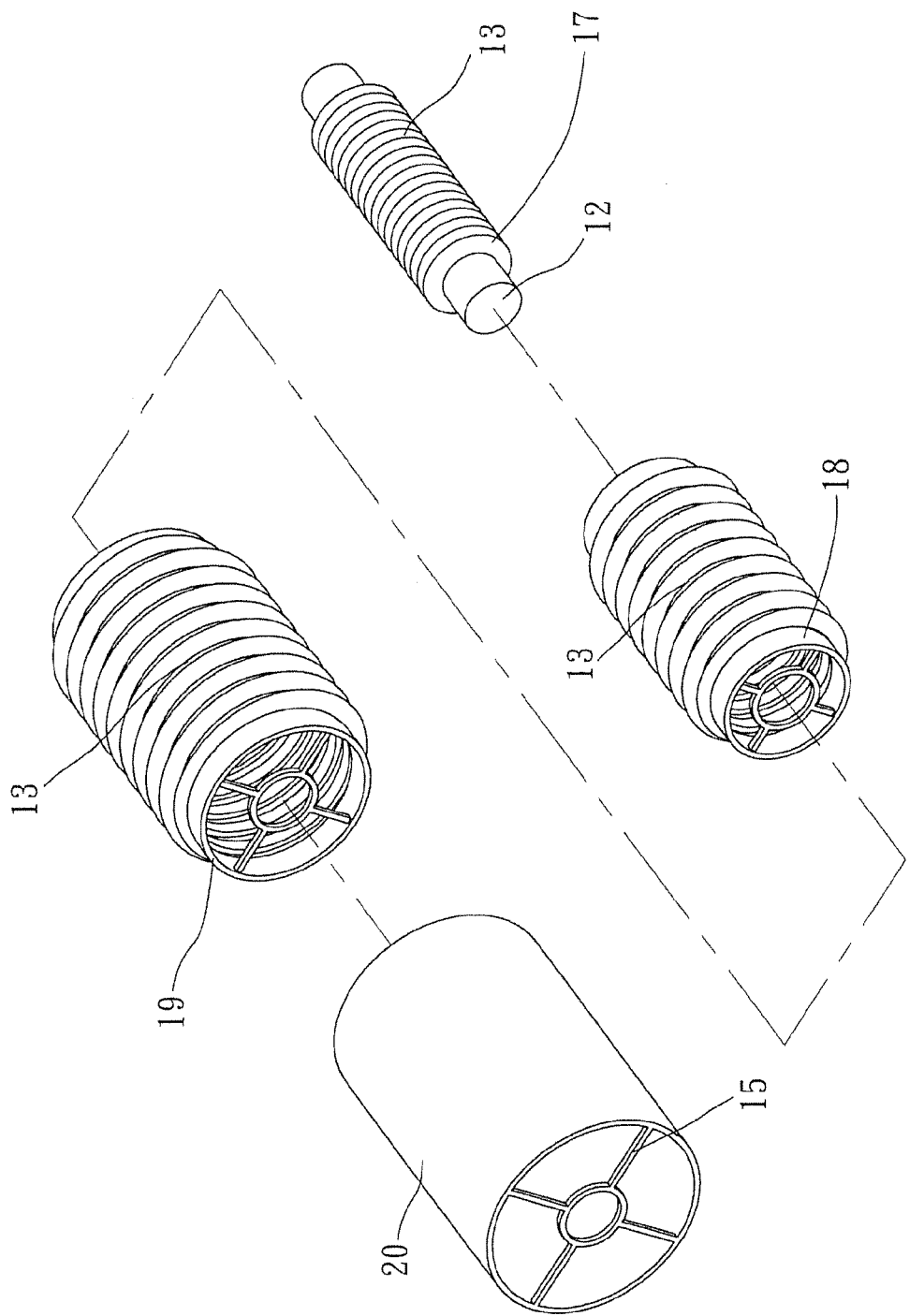

The tubular electrodes 17; 18; 19 have different diameters, as shown in FIGS. 6 and 6-1. The inner tubular electrode 17 has inner diameter 80 mm. The tubular electrodes 17; 18; 19 commonly have a wall thickness 2 mm. The pitch between the outer tubular electrode 19 and the intermediate tubular electrode 18 and the pitch between the intermediate tubular electrode 18 and the inner tubular electrode 17 are 10 mm. The rod electrode 12 and the outer perimeter of the tubular electrodes 17; 18; 19 are respectively processed to provide cone ring portions and transverse grooves 13 around the cone ring portions. The transverse grooves 13 at the tubular electrodes 17; 18; 19 are disposed in a stagger manner relative to that at the rod electrode 12. The outer tubular electrode 19 and the intermediate tubular electrode 18 are supported between two brackets 15. Further, the outer tubular electrode 19 is peripherally coated with a 3 mm electrically insulative protective layer.

Figure 8:
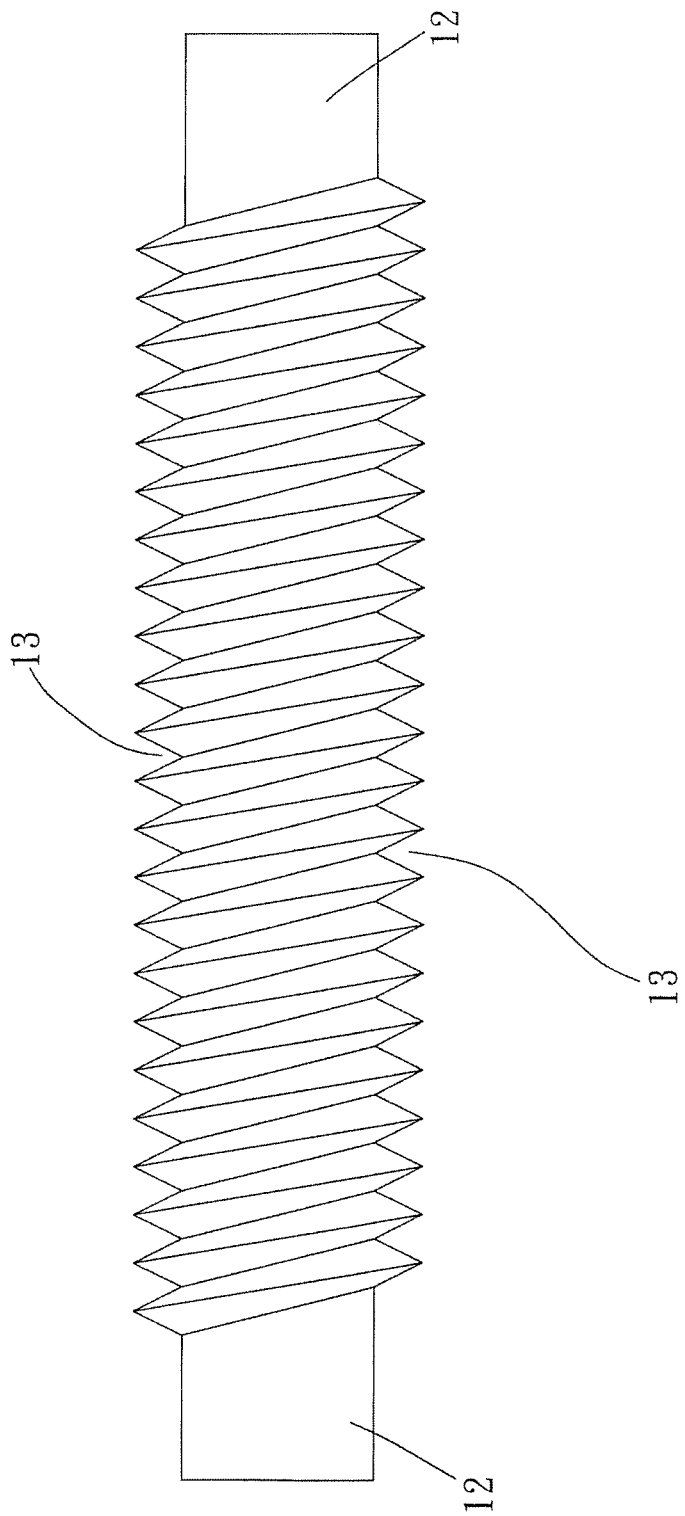
FIG. 8 illustrates another example of the rod electrode in accordance with the present invention, wherein the transverse grooves is disposed at a 30° relationship relative to the axis of the rod electrode.

The rod electrode 12 of each processing unit 1 is positioned at the center inside the associating tubular electrodes 17; 18; 19, i.e., inserted through the tubular electrodes 17; 18; 19. The rod electrode 12 and the tubular electrodes 17; 18; 19 are selected from a material having excellent electric conductivity. The rod electrode 12 of each processing unit 1 is processed to provide cone ring portions and transverse grooves 13 around the cone ring portions. The transverse grooves 13 of the rod electrode 12 are configured at 30° relative to the axis of the rod electrode 12, as shown in FIG. 8. The cone ring portions of the rod electrode 12 work as the high voltage discharge terminal.

During application, the rod electrode 12 is electrically connected to the positive pole, and 15 kv is applied.

Example IV

Figure 9:
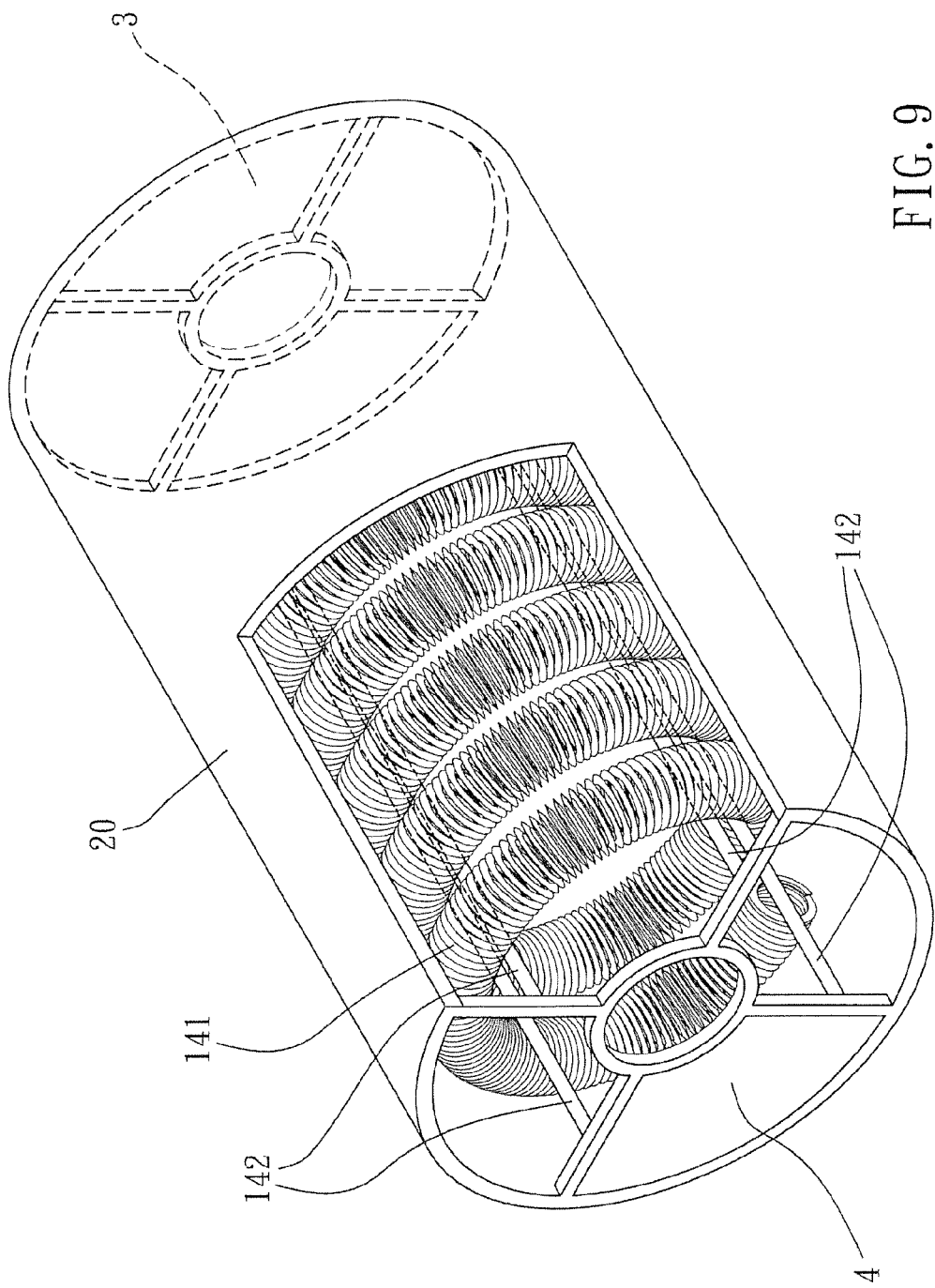
FIG. 9 is a cutaway view of present invention, illustrating the spiral electrode of FIG. 4 wound around support rods to form a hollow helical electrode inside an insulating barrel.
Figure 10:
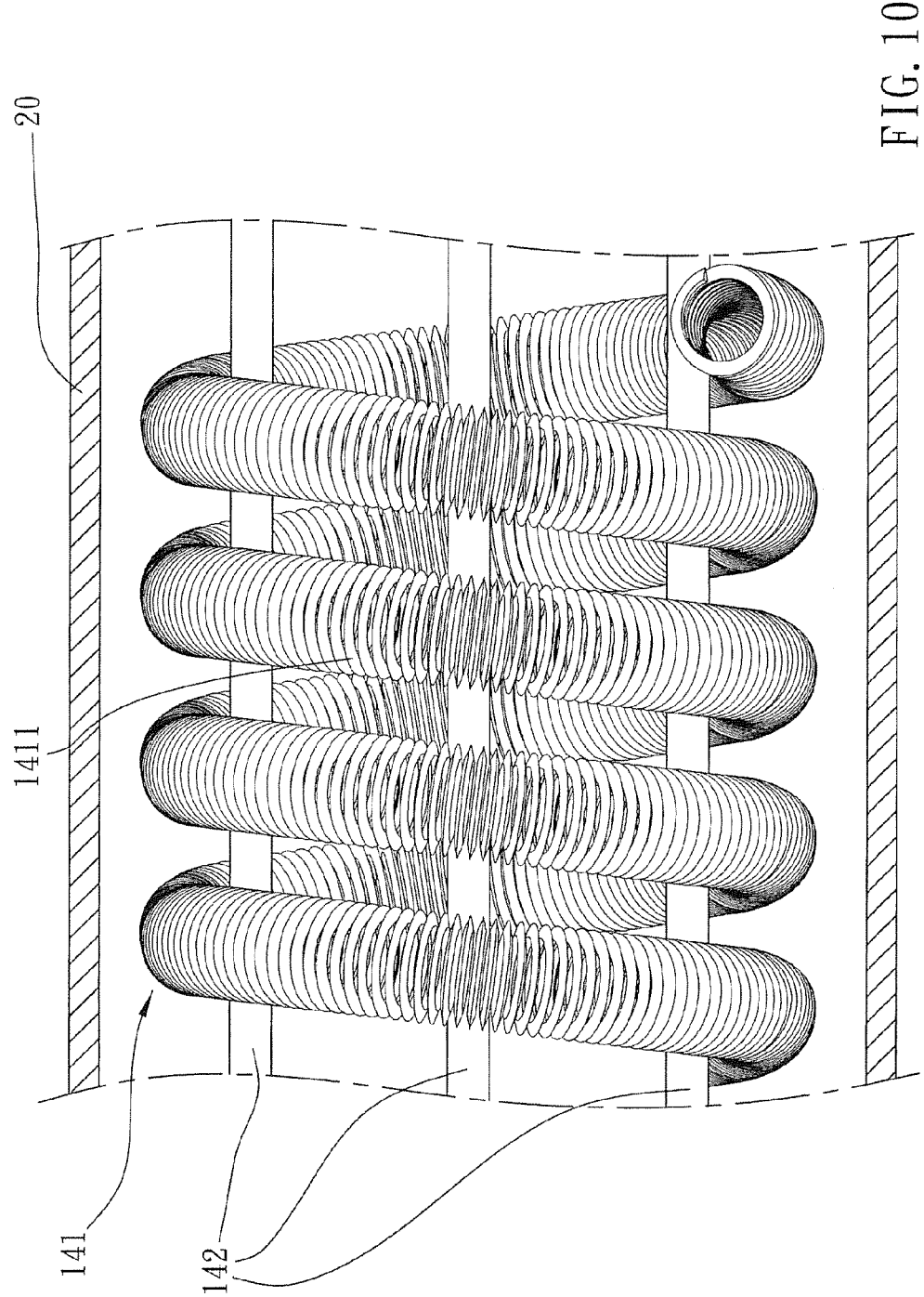
FIG. 10 is an enlarged view of a part of FIG. 9.

As shown in FIGS. 9 and 10, a spiral electrode 14 shown in FIG. 4 is wound around support rods 142, forming a hollow helical electrode 141. An electrically insulative material is provided to surround the hollow helical electrode 141 and kept apart from the hollow helical electrode 141 at a pitch in the range 1-100 mm. The electrically insulative material can be made having a circular or rectangular configuration, or any other profile, for example, the electrically insulative material can be an insulating barrel 20 having a gas inlet 3 and a gas outlet 4. Electric power is directly connected to the hollow helical electrode 141. Further, the hollow helical electrode 141 comprising a plurality of discharge coil rings 1411 connected in series in a spiral manner, each discharge coil ring 1411 providing a sharp-pointed discharge terminal.

Example V

Figure 11:
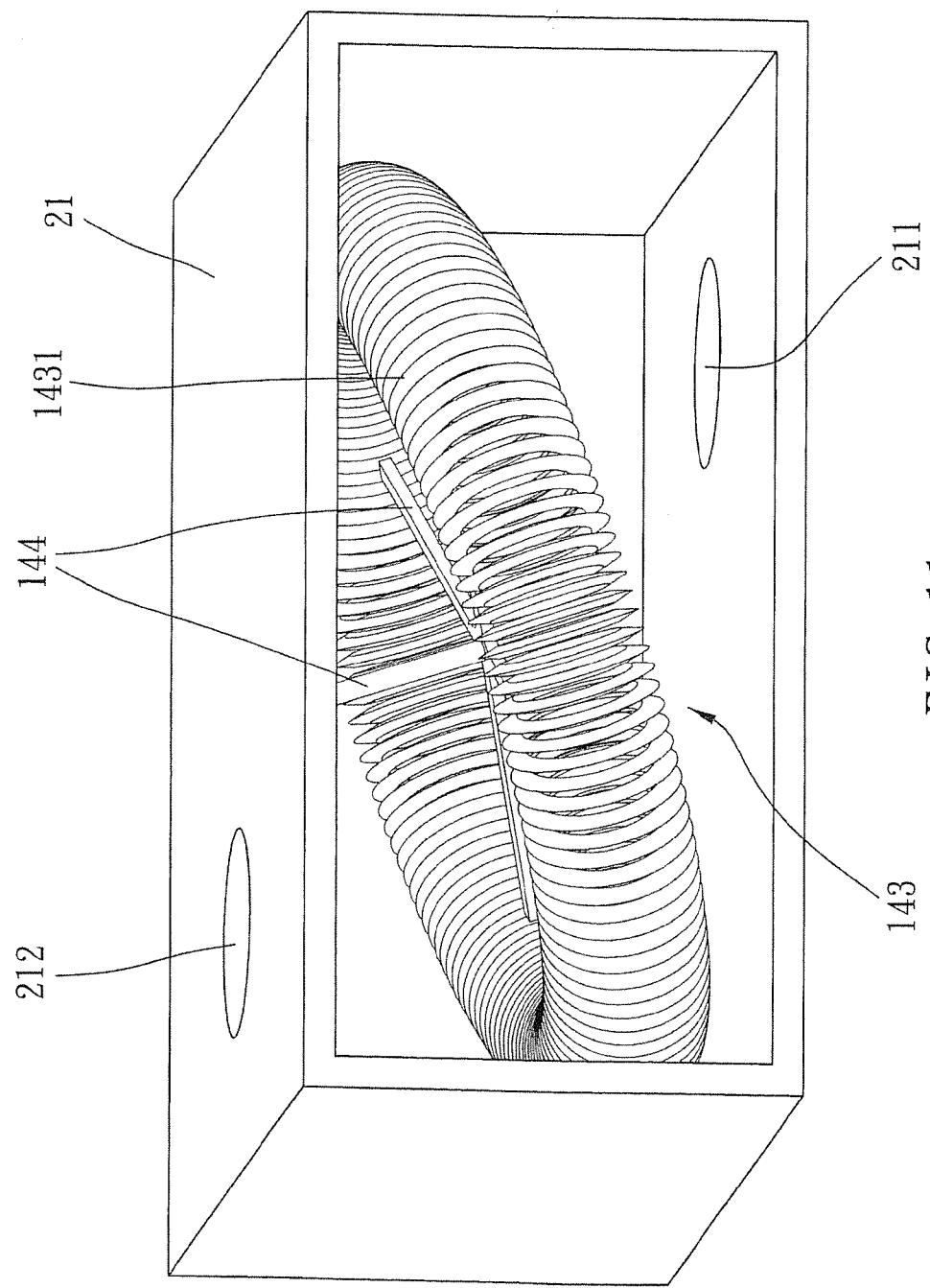
FIG. 11 a schematic elevational view of the present invention, illustrating the spiral electrode of FIG. 4 arranged into a hollow annular shape and held down by a support to form a hollow annular spiral electrode in an electrically insulative housing having a gas inlet and a gas outlet.

As shown in FIG. 11, a spiral electrode 14 shown in FIG. 4 is arranged into a hollow annular shape and held down by a support 144, forming a hollow annular spiral electrode 143. The annular spiral electrode 143 is mounted in an electrically insulative housing 21 having a gas inlet 211 and a gas outlet 212. Electric power is directly connected to the hollow annular spiral electrode 143. The hollow annular spiral electrode 143 comprises a plurality of discharge coil rings 1431 connected in series in a spiral manner, each discharge coil ring 1431 providing a sharp-pointed discharge terminal.

Example V

Figure 12:
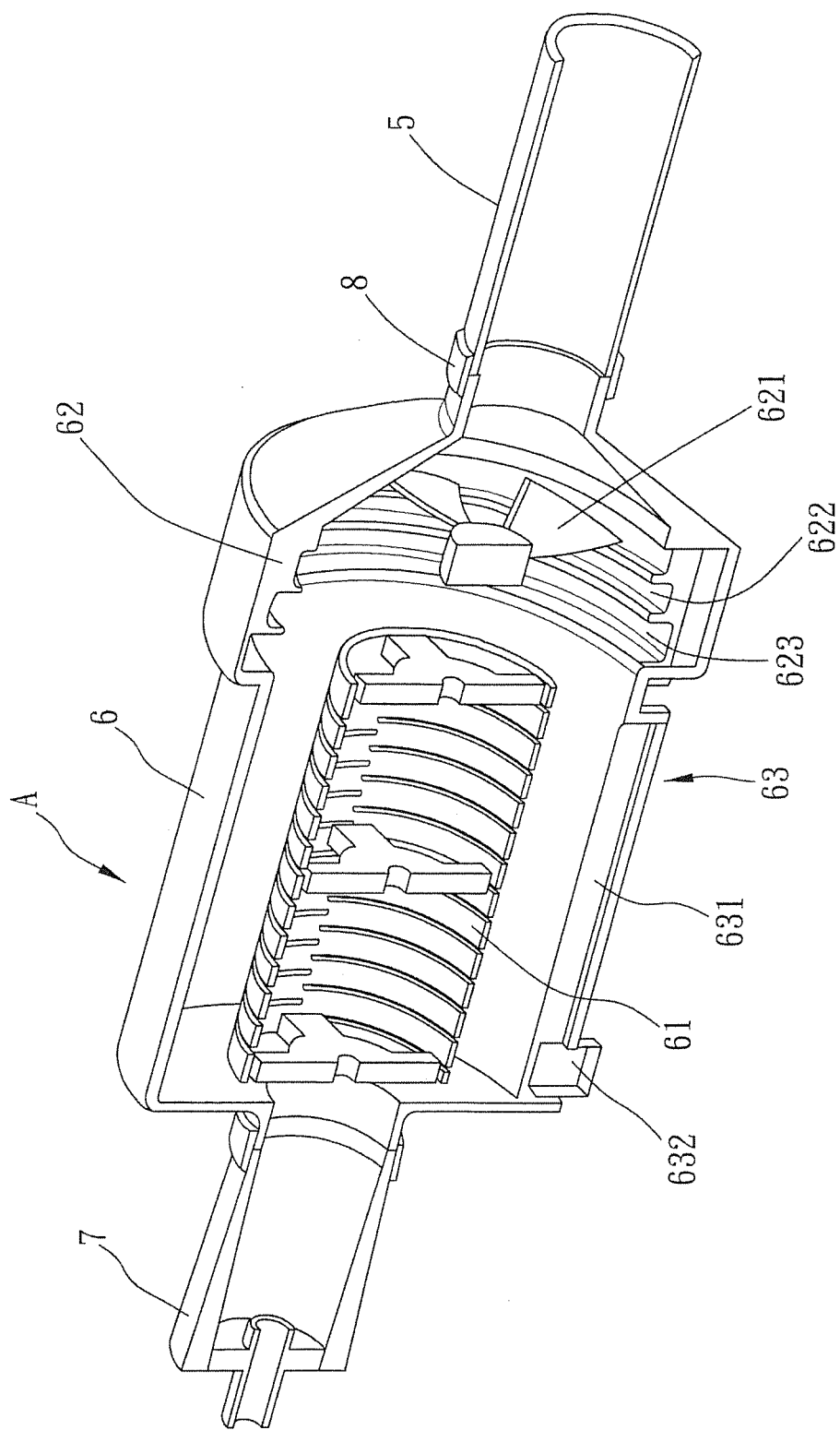
FIG. 12 is a sectional elevation of an engine fumes decomposition device in accordance with the present invention.

As shown in FIG. 12, an engine fumes decomposition device A in accordance with the present invention is shown for processing the discharged waste gas of an engine. The engine fumes decomposition device A comprises a gas intake pipe 5, a processing unit 6, and a gas outlet pipe 7. The processing unit 6 comprises a high-pressure discharge reactor 61, a pre-processing module 62, and a waste recycling module 63.

Figure 13:
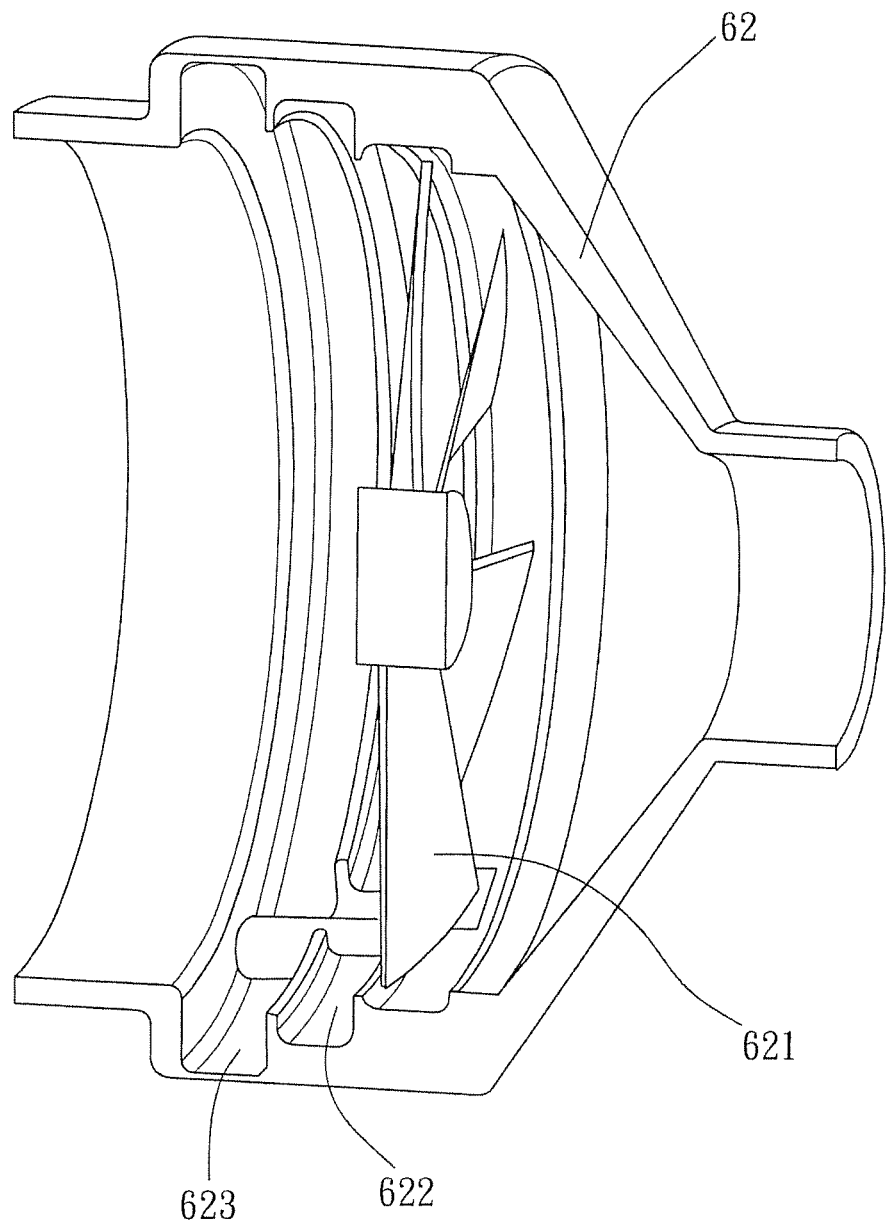
FIG. 13 is an enlarged view of a pre-processing module of the engine fumes decomposition device shown in FIG. 12.

As shown in FIGS. 12 and 13, the pre-processing module 62 comprises a centrifugal fan 621, a waste interceptor 622 and a waste discharge port 623. The waste interceptor 622 is adapted to stop and recycle solid or liquid wastes thrown by the centrifugal fan 621. The waste discharge port 623 is adapted to discharge the intercepted solid or liquid wastes.

As shown in FIG. 12, the waste recycling module 63 comprises a waste guide groove 631 and a waste re-discharge port 632.

During installation, connect the front and rear ends of the processing unit 6 to the gas intake pipe 5 and the gas outlet pipe 7 respectively by a respective connector 8, and then connect the gas intake pipe 5 to the engine exhaust port, and then electrically connect the high-pressure discharge reactor 61 and the centrifugal fan 621 to power supply.

During application, turn on the high-pressure discharge reactor 61 and the centrifugal fan 621, causing the centrifugal fan 621 to draw in the vehicle waste gas through the gas intake pipe 5. At this time, solid or liquid wastes are drawn through the waste interceptor 622 and the waste discharge port 623 for pre-treatment. After pre-treatment, the residual solid or liquid wastes are thrown onto the waste recycling module 63 by a centrifugal force, and the waste gas is decomposed by the high-pressure discharge reactor 61. By means of applying several kV high voltage to the surface of the hollow electrode of the high-pressure discharge reactor 61, the molecular bonds of the waste gas can be broken, causing carbon monoxide to be converted into carbon and oxygen, hydrocarbons to be converted into carbon, oxygen and water, and nitrogen oxides to be converted into nitrogen and oxygen.

Thus, the engine fumes decomposition device A achieves better waste gas purification effects than conventional techniques using catalysts and filters. The engine fumes decomposition device A does not produce the greenhouse gas of carbon dioxide, and can enrich oxygen in air.

What the invention claimed is:

1. A combination discharge reactor for decomposing an oil smoke, comprising:
    a housing defining at least one gas inlet and at least one gas outlet; and
    a plurality of processing units mounted inside said housing, each said processing unit comprising a support structure comprising a plurality of brackets respectively mounted in said at least one gas inlet and said at least one gas outlet and a plurality of support rods connected between said brackets, a rod electrode prepared by an electric conducting material and mounted in said bracket between said at least one gas inlet and said at least one gas outlet, a tubular electrode prepared by an electric conducting material and mounted in said brackets between said at least one gas inlet and said at least one gas outlet and surrounding said rod electrode, said tubular electrode of each said processing unit including an inner tubular electrode, an intermediate tubular electrode concentrically surrounding said inner tubular electrode and kept apart from said inner tubular electrode at a pitch 10 mm, and an outer tubular electrode concentrically surrounding said intermediate tubular electrode and kept apart from said intermediate tubular electrode at a pitch 10 mm, said inner tubular electrode, said intermediate tubular electrode and said outer tubular electrode being respectively peripherally processed to provide said cone ring portions and said transverse grooves, said outer tubular electrode and said intermediate tubular electrode being supported between said brackets, said outer tubular electrode being peripherally coated with an electrically insulative protective layer.

2. The combination discharge reactor as claimed in claim 1, wherein said tubular electrode is peripherally processed to provide a plurality of cone ring portions around an outer perimeter thereof and a plurality of transverse grooves around said cone ring portions, the cone ring portions of said tubular electrode being adapted to work as high voltage discharge terminals, said tubular electrode being formed of multiple tubular electrode layers arranged in a concentric manner.

3. The combination discharge reactor as claimed in claim 1, wherein said rod electrode and said tubular electrode are kept at a pitch in the range 0-100 mm.

4. The combination discharge reactor as claimed in claim 1, wherein said rod electrode is peripherally processed to provide a plurality of cone ring portions around an outer perimeter thereof.

5. The combination discharge reactor as claimed in claim 1, further comprising an applied power supply having a voltage in the range 6 kv~500 kv, said applied power supply being connected to said rod electrode and a concentric of each discharge layer.

6. The combination discharge reactor as claimed in claim 1, wherein said housing has one of a circular shape and a rectangular shape.

7. The combination discharge reactor as claimed in claim 1, wherein said tubular electrode of each said processing unit is a spiral electrode.

8. A combination discharge reactor for decomposing an oil smoke, comprising:
    a housing defining at least one gas inlet and at least one gas outlet; and
    a plurality of processing units mounted inside said housing, each said processing unit comprising a support structure comprising a plurality of brackets respectively mounted in said at least one gas inlet and said at least one gas outlet and a plurality of support rods connected between said brackets, a rod electrode prepared by an electric conducting material and mounted in said bracket between said at least one gas inlet and said at least one gas outlet, a tubular electrode prepared by an electric conducting material and mounted in said brackets between said at least one gas inlet and said at least one gas outlet and surrounding said rod electrode, said tubular electrode of each said processing unit including a plurality of support rods, a spiral electrode wound around said support rods to form a hollow helical electrode that is directly electrically connected to a power supply, and an electrically insulative material surrounding said hollow helical electrode and kept apart from said hollow helical electrode at a pitch in the range 1-100 mm, said electrically insulative material being selectively configured in the shape of a circular or rectangular barrel having a gas inlet and a gas outlet.

9. The combination discharge reactor as claimed in claim 8, wherein said hollow helical electrode comprises a plurality of discharge coil rings connected in series in a spiral manner, each said discharge coil ring providing a sharp-pointed discharge terminal.

10. A combination discharge reactor for decomposing an oil smoke, comprising:
   a housing defining at least one gas inlet and at least one gas outlet; and
   a plurality of processing units mounted inside said housing, each said processing unit comprising a support structure comprising a plurality of brackets respectively mounted in said at least one gas inlet and said at least one gas outlet and a plurality of support rods connected between said brackets, a rod electrode prepared by an electric conducting material and mounted in said bracket between said at least one gas inlet and said at least one gas outlet, a tubular electrode prepared by an electric conducting material and mounted in said brackets between said at least one gas inlet and said at least one gas outlet and surrounding said rod electrode, said tubular electrode of each said processing unit including a spiral electrode arranged into a hollow annular shape and held down by a support to form a hollow annular spiral electrode that is directly electrically connected to a power supply, said annular spiral electrode being mounted in an electrically insulative housing having a gas inlet and a gas outlet.

11. The combination discharge reactor as claimed in claim 10, wherein said hollow annular spiral electrode comprises a plurality of discharge coil rings connected in series in a spiral manner, each said discharge coil ring providing a sharp-pointed discharge terminal.

* * * * *